(12) United States Patent
Mitchell et al.

(10) Patent No.: US 7,670,259 B2
(45) Date of Patent: Mar. 2, 2010

(54) AUTOMATIC BRAKING SYSTEM

(75) Inventors: Andrew L. Mitchell, Indianapolis, IN (US); Brett R. Caldwell, New Palestine, IN (US)

(73) Assignee: GM Global Technology Operations, Inc., Detroit, MI (US)

(*) Notice: Subject to any disclaimer, the term of this patent is extended or adjusted under 35 U.S.C. 154(b) by 503 days.

(21) Appl. No.: 11/620,113

(22) Filed: Jan. 5, 2007

(65) Prior Publication Data

US 2008/0167161 A1 Jul. 10, 2008

(51) Int. Cl.
 B60W 10/10 (2006.01)
 B60W 10/18 (2006.01)

(52) U.S. Cl. ............... 477/92; 477/118; 477/186; 477/188

(58) Field of Classification Search ............ 477/184, 477/186, 188
 See application file for complete search history.

(56) References Cited

U.S. PATENT DOCUMENTS 6,212,458 B1  4/2001  Walenty et al.
6,249,735 B1 * 6/2001 Yamada et al. ............ 701/65
6,349,253 B1  2/2002  Bellinger

FOREIGN PATENT DOCUMENTS

JP     11208437     8/1999

* cited by examiner

Primary Examiner—Sherry L Estremsky
Assistant Examiner—Erin D Bishop

(57) ABSTRACT

A system for braking a vehicle includes a transmission having a plurality of gear sets for establishing a plurality of forward and reverse gear ratios and an actuator for changing the gear ratios. The system also includes a plurality of sensors for detecting a plurality of vehicle operating parameters and an auxiliary brake for reducing a speed of the vehicle. A controller having a processor configured to receive a plurality of output signals from the plurality of sensors has control logic for activating one of the actuator and the auxiliary brake based on the received output signals. A method for operating the system for braking is also provided. The method includes determining road grade, determining an acceleration of the vehicle, determining an activation status of the primary brake, determining a position of the throttle, determining whether extra braking is and activating the auxiliary brake based on the extra braking determination.

16 Claims, 3 Drawing Sheets

AUTOMATIC BRAKING SYSTEM

FIELD

The present disclosure relates to a braking system, and more particularly to a braking system and method used with an automatic transmission in a motor vehicle.

BACKGROUND

The statements in this section merely provide background information related to the present disclosure and may not constitute prior art.

Braking a motor vehicle, whether a passenger vehicle or commercial truck, involves an operator of the vehicle manually engaging a primary brake. Engagement of the primary brake typically involves increasing the friction between the brake element and the axle of the vehicle, though other types of braking are known in the art. While this method of braking is welt known and useful for its intended purpose, relying solely on a manually operated brake while on a steep road grade can increase the wear on the brake which can reduce the useful life of the brake. For example, increased wear can lead to an increased rate of the reduction of the brake lining, increased rotor temperature, and increased brake fade.

One solution to avoid excessive wear on the primary brake while on steep road grades is to apply extra braking. The extra braking can include various forms of braking, including downshifting of the transmission in the motor vehicle, activation of engine compression brakes, or activation of an exhaust brake. While useful for reducing wear on the primary brake, in the past this extra braking was manually engaged by the operator of the motor vehicle, thereby increasing the complexity of operating the vehicle.

One solution to the above problem is to automatically activate downshifting, as disclosed in U.S. Pat. No. 6,212,458 B1, hereby incorporated by reference as if fully disclosed herein. While automatic downshifting is useful for its intended purpose, there is room in the art for improvement in providing additional mechanical automatic extra braking to a motor vehicle.

SUMMARY

It is an object of the present invention to provide the art with an automatic braking system for a motor vehicle.

In one aspect of the present invention, a system for braking a vehicle is provided that includes a transmission having a plurality of gear sets for establishing a plurality of forward and reverse gear ratios and an actuator for changing the gear ratios, a plurality of sensors for detecting a plurality of vehicle operating parameters, an auxiliary brake for reducing a speed of the vehicle, and a controller having a processor configured to receive a plurality of output signals from the plurality of sensors and wherein the controller has control logic for activating one of the actuator and the auxiliary brake based on the received output signals.

In another aspect of the present invention, the system includes a primary brake for reducing the speed of the vehicle and the control logic includes a first control logic for determining if the primary brake is activated.

In yet another aspect of the present invention, the system includes a throttle for controlling an acceleration of the vehicle the control logic includes a second control logic for determining a position of the throttle.

In yet another aspect of the present invention, the control logic includes a third control logic for calculating a road grade from the input signals from the plurality of sensors.

In yet another aspect of the present invention, the plurality of output signals from the plurality of sensors includes an output signal indicative of an acceleration of the vehicle and a speed of the vehicle.

In yet another aspect of the present invention, the control logic includes a fourth control logic to activate one of the auxiliary brake or actuator based on the primary brake is activated, throttle activation, the road grade, the acceleration, and the speed.

It is another object of the present invention to provide the art with a method for automatically providing extra braking to a motor vehicle.

In one aspect of the present invention, a method for braking a vehicle having a throttle, a primary brake and an auxiliary brake is provided, the method including the steps of determining a road grade, determining an acceleration of the vehicle, determining an activation status of the primary brake, determining a position of the throttle, determining whether extra braking is desirable based on the road grade, the acceleration of the vehicle, the activation status of the primary brake, and the amount of engagement of the throttle, and activating the auxiliary brake based on the extra braking determination.

In another aspect of the present invention, determining whether extra braking is desirable further comprises determining whether the road grade exceeds a road grade threshold, whether the vehicle is accelerating, whether the primary brake is activated, and the position of the throttle.

In another aspect of the present invention, the method further includes determining a first amount of time the vehicle acceleration is different than a first threshold, a second amount of time the vehicle acceleration is different than a second threshold with the auxiliary brake activated, and a third amount of time the primary brake is activated.

In another aspect of the present invention, determining whether extra braking is desirable includes combining the road grade, the speed of the vehicle, the amount of engagement of the throttle, the first time, the second time, and the third time into a combined factor.

In another aspect of the present invention, the combined factor is compared to an auxiliary brake threshold and the auxiliary brake is activated if the combined factor is greater than the auxiliary brake threshold.

In another aspect of the present invention, the vehicle includes an automatic transmission with a plurality of drive ratios, and determining whether extra braking is desirable includes comparing the combined factor to a downshift threshold and the drive ratio is changed when the combined factor is greater than the downshift threshold.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
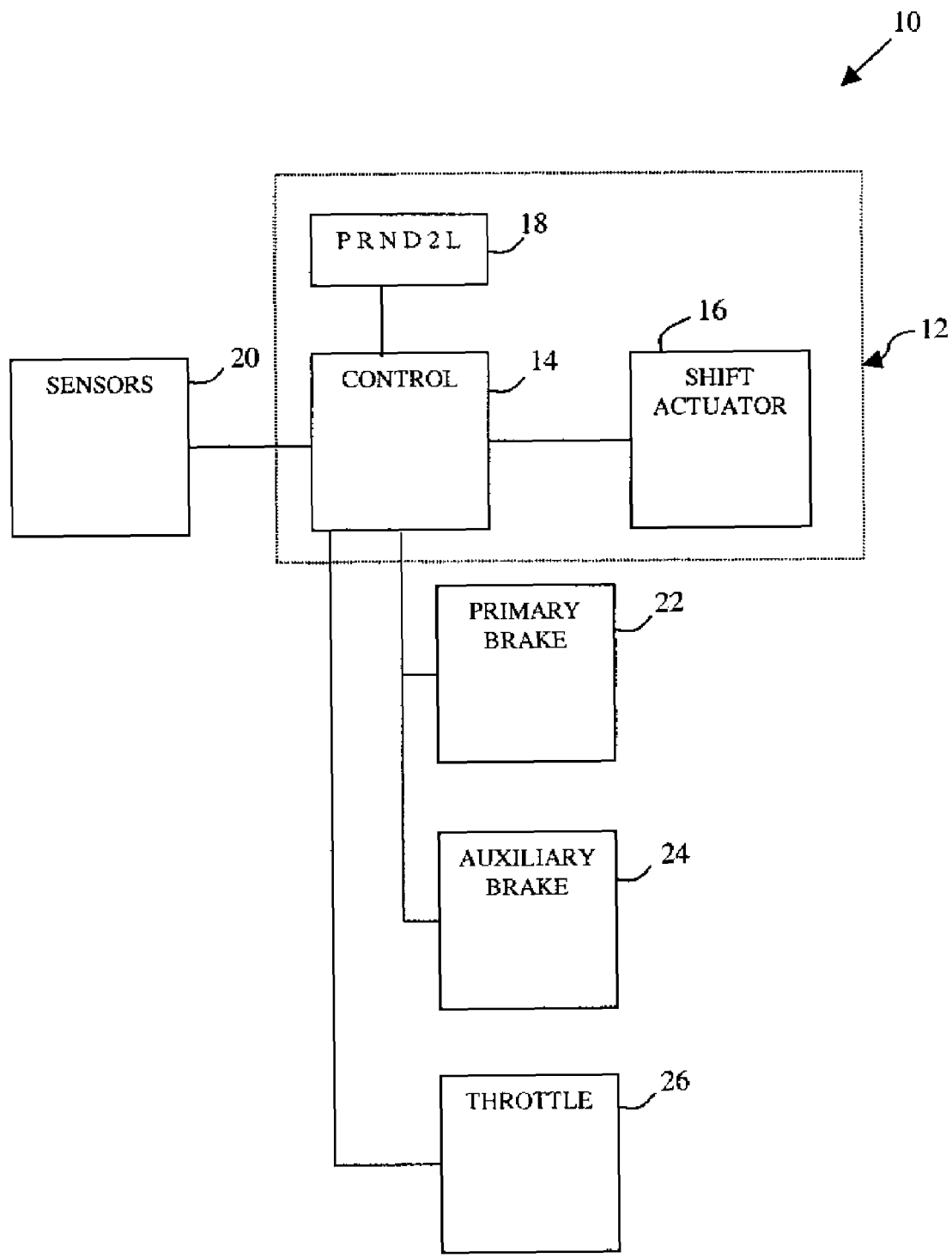
FIG. 1 is a schematic diagram of a braking system in accordance with the principles of the present invention.

FIG. 1 illustrates a braking system 10 in accordance with the principles of the present invention. The braking system 10 may be incorporated within a motor vehicle (not particularly shown). The braking system 10 includes an automatic transmission 12. The automatic transmission 12 may be any one of a set of well known automatic transmissions known in the art and having a plurality of gear sets for establishing a plurality of forward and reverse gear ratios (not shown).

The automatic transmission 12 includes a controller 14 in electronic communication with a shift actuator 16 and a gear selector 18. The controller 14 is an electronic device having a preprogrammed digital computer or processor, control logic, memory used to store data, and at least one I/O section. The control logic includes a plurality of logic routines for monitoring, manipulating, and generating data. The shift actuator 16 is coupled to the plurality of gear sets within the automatic transmission 12 and is operable to change the gear ratio. The gear selector 18 is selectively actuated by an operator of the motor vehicle to select one of the plurality of forward or reverse gear ratios. During operation, an operator manually operates the gear selector 18 to select different gear ratios, for example, a park, reverse, neutral, or forward gear ratio. This selection is communicated to the controller 14 and the controller 14 then activates the shift actuator 16 to change the gear ratio of the automatic transmission 12.

The brake system 10 further includes a plurality of sensors 20 coupled to the motor vehicle. The sensors 20 are in electronic communication with the processor of the controller 14. The sensors 20 collect data regarding the operating parameters of the motor vehicle and generate output signals indicative of the vehicle operating parameters. These output signals are electronically communicated to the controller 14. The controller 14 then continuously or periodically monitors the output signals. The output signals include information regarding a speed of the vehicle and an acceleration of the vehicle. The output signals may include other kinds of data, for example, battery voltage, engine temperature, or oil pressure.

The brake system 10 includes a primary brake 22 and an auxiliary brake 24. The primary brake 22 is used to reduce the speed of the vehicle and is preferably an operator actuated friction brake, though other brakes known in the art may be used. The primary brake 22 is in electronic communication with the controller 14 such that the controller 14 receives an output signal from the primary brake 22 indicating when the primary brake is engaged. The auxiliary brake 24 is a device used to reduce the speed of the vehicle and may include an exhaust brake, an exhaust compression brake, a variable nozzle turbocharger, a variable geometry turbocharger, an input retarder, an output retarder, or an electric motor.

The auxiliary brake 24 is in electronic communication with the controller 14. When extra braking is desired, the controller 14 sends a control signal to the auxiliary brake 24 and the auxiliary brake 24 is activated or engaged.

The brake system 10 includes a throttle 26 in electronic communication with the controller 14. The throttle 26 is coupled to an engine (not shown) in the motor vehicle. The throttle 26 preferably includes a pedal (not shown) and the operator may engage the throttle 26 by depressing the pedal when the operator desires to accelerate the motor vehicle. One of the plurality of sensors 20 then sends an output signal to the controller 14 indicating a position of the throttle 26. Alternatively, the throttle 26 sends an electronic output signal to the controller 14 indicating a position of the throttle 26.

Figure 2:
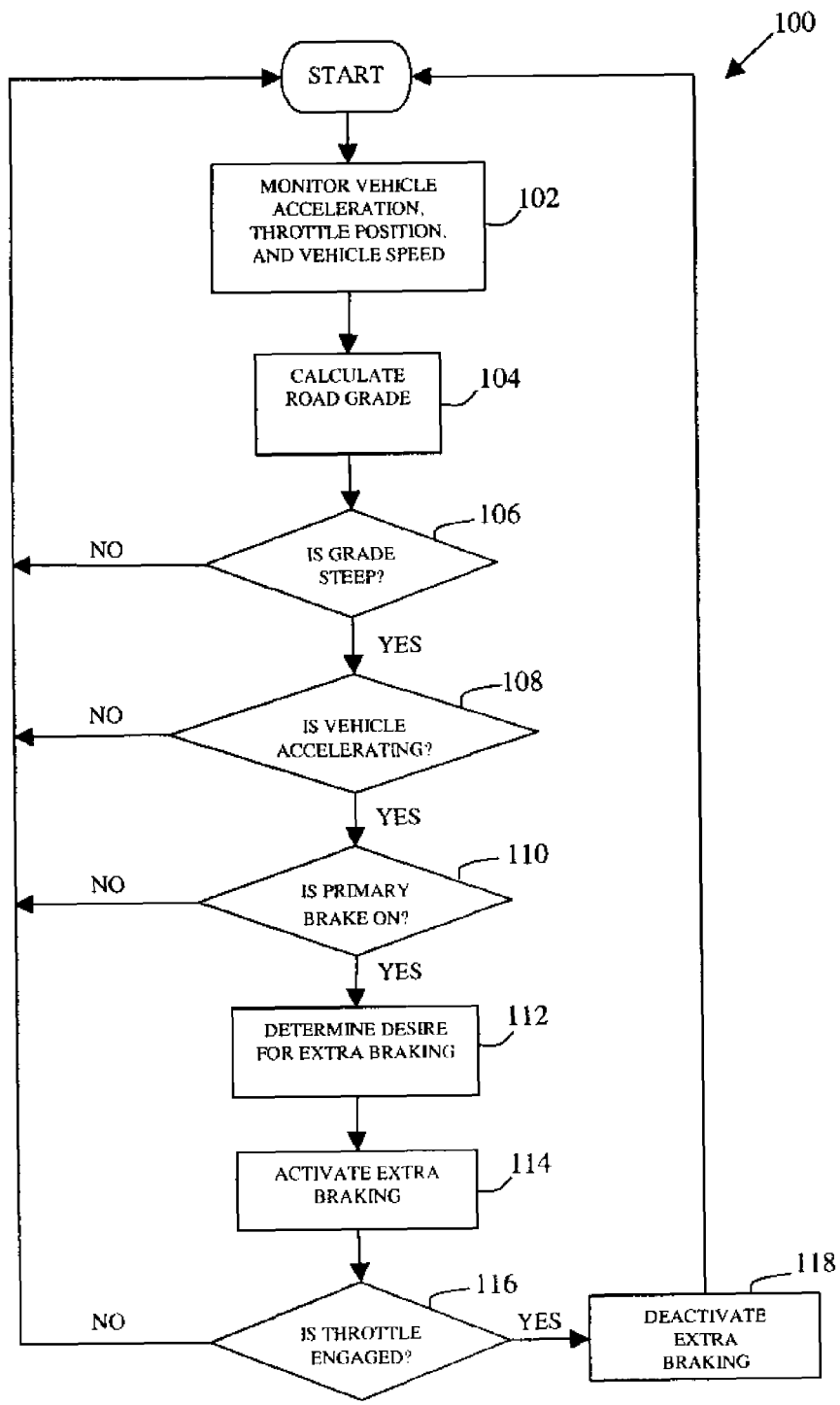
FIG. 2 is a flow chart of a method for braking using the braking system of the present invention.

Turning now to FIG. 2, a method for braking 100 employing the braking system 10 is illustrated in flowchart form. The method for braking 100 begins at step 102 where the controller 14 monitors the output signals from the plurality of sensors 20. The output signals include data such as vehicle acceleration, the position of the throttle 26, and vehicle speed.

A road grade is then calculated at step 104 by the controller 14. Various methods for calculating the road grade may be employed. In the present invention, the road grade is calculated as a percent grade using the following formula:

$$\% \text{ Grade} = (F_{TractiveEffort} - m_{veh}a_{veh} - F_{aero} - F_{RollingResistance})/(m_{veh}g) \quad (1)$$

wherein $F_{TractiveEffort}$ is the tractive effort of the motor vehicle, $m_{veh}$ is the mass of the vehicle, $a_{veh}$ is the vehicle acceleration, $F_{aero}$ is an aerodynamic force, and $F_{RollingResistance}$ is the force of rolling resistance of the motor vehicle, and g is the constant acceleration due to gravity. $F_{TractiveEffort}$ is calculated using the following formula:

$$F_{TractiveEffort} = (CTR*(M_{Engine} - (I_{Engine}*\omega_{Engine}) - M_{AuxBrake})*K_{TransGearRatio}*K_{Tire}*K_{Axle}) - F_{PrimaryBrake} \quad (2)$$

wherein CTR is the converter torque ratio, $M_{Engine}$ is the engine torque, $I_{Engine}$ is the engine inertia, $\omega_{Engine}$ is the engine acceleration, $M_{AuxBrake}$ is the auxiliary braking torque, $K_{TransGearRatio}$ is a pre-set automatic transmission gear ratio factor, $K_{Tire}$ is a pre-set tire factor, and $K_{Axle}$ is a pre-set axle factor, and $F_{PrimaryBrake}$ is the force of the primary brake 22. $F_{PrimaryBrake}$ is preferably zero as the road grade is preferably calculated when the primary brake 22 is not activated. $F_{aero}$ is calculated using the following formula:

$$F_{aero} = v_{veh}^2 * K_{DragCoeff} \quad (3)$$

wherein $v_{veh}$ is the vehicle speed and $K_{DragCoeff}$ is a pre-set drag coefficient for the motor vehicle. $F_{RollingResistance}$ is calculated using the following formula:

$$F_{RollingResistance} = m_{veh} * K_{RollingRes} \quad (4)$$

wherein $K_{RollingRes}$ is a pre-set rolling resistance factor for the motor vehicle.

At step 106, the controller 14 compares the road grade calculated at step 104 to a road grade threshold. The road grade threshold is a value set to indicate whether the road grade is steep. If the road grade is not steep, the method 100 proceeds back to step 102 and the controller 14 continues to monitor the output signals from the plurality of sensors 20. If the road grade calculated at step 104 exceeds the road grade threshold, the method 100 proceeds to step 108.

At step 108, the controller 14 determines whether the vehicle is accelerating. Acceleration of the vehicle can be determined from the output signals from the plurality of sensors 20 or alternatively by calculation using a derivative of a transmission output speed multiplied by tire and axle factors. If the vehicle is not accelerating, the method 100 proceeds back to step 102 and the controller 14 continues to monitor the output signals from the plurality of sensors 20. If the vehicle is accelerating, the method 100 proceeds to step 110.

At step 110, the controller 14 determines whether the primary brake 22 has been activated by the operator of the motor vehicle. If the primary brake 22 has not been activated, this indicates that the operator does not desire to slow the vehicle, and the method 100 proceeds back to step 102 where the controller 14 continues to monitor the output signals from the plurality of sensors 20. If the primary brake 22 has been activated, this indicates that the operator is attempting to slow the vehicle, and the method 100 proceeds to step 112.

At step 112 the controller 14 determines the desire for extra braking. As will be described in further detail below, determining the desire for extra braking involves analyzing and manipulating the data from the plurality of sensors 20 to determine the type or method of extra braking desired.

Once it has been determined the type or method of extra braking desired, the extra braking is activated at step 114. The controller 14 sends a signal to activate the auxiliary brake 24, the shift actuator 16, or both. The controller 14 will preferably activate the auxiliary brake 24 before activating the shift actuator 16.

At step 116 the controller 14 determines whether the throttle 26 has been engaged. If the throttle 26 has not been engaged, the method 100 continues to monitor the output signals from the plurality of sensors 20. If the throttle 26 has been engaged, this indicates that the operator no longer wishes to brake, and the extra braking is deactivated at step 118. The method 100 then continues to monitor the output signals from the plurality of sensors 20 at step 102.

Figure 3:
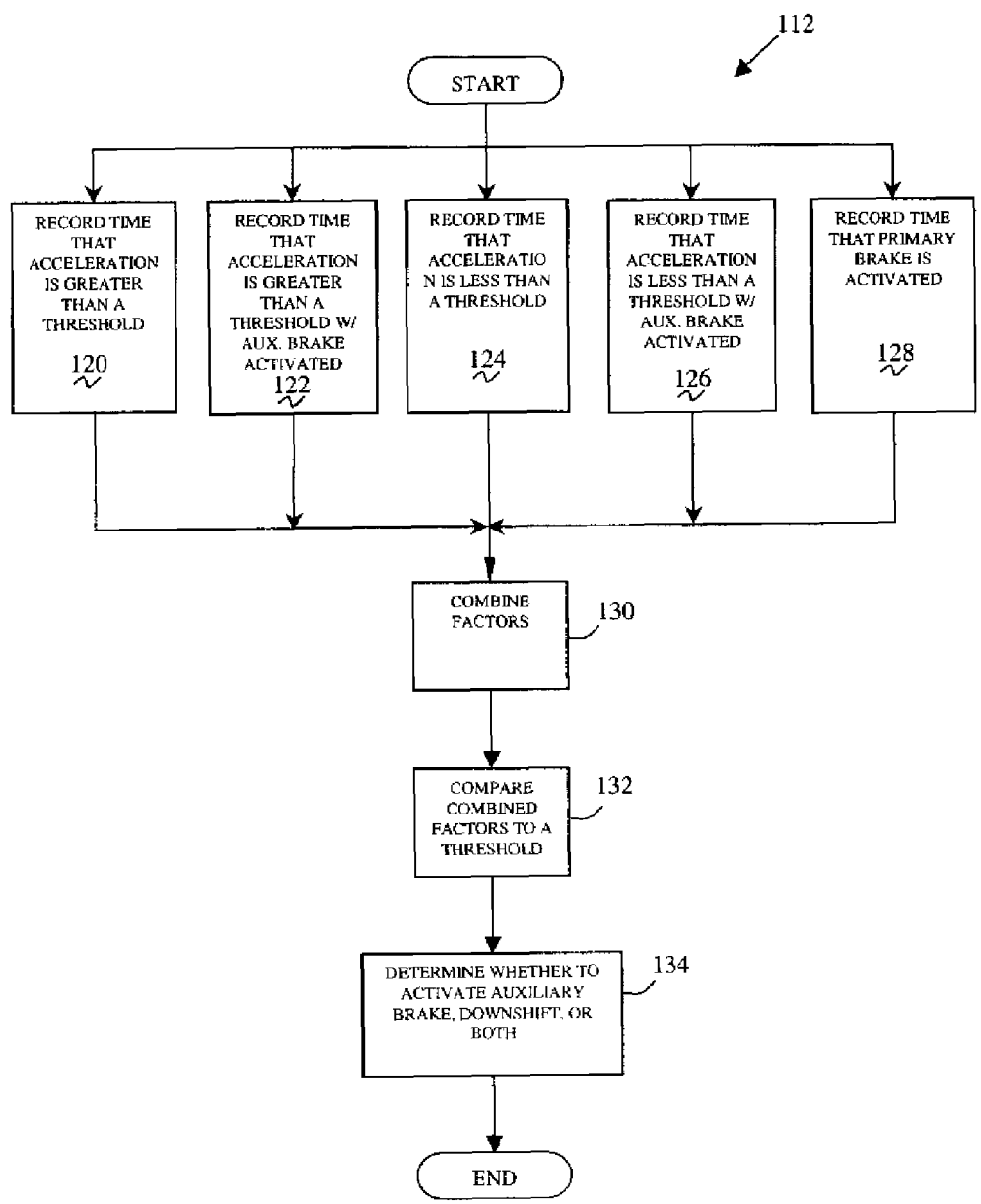
FIG. 3 is a flow chart detailing the step for determining the desire for extra braking according to the present invention.

Turning now to FIG. 3, a flowchart illustrating a method for determining the desire for extra braking at step 112 is provided. Step 112 begins by recording a plurality of times. First, at step 120, the controller 14 records an amount of time that the acceleration of the vehicle (a first recorded amount of time) is greater than a threshold compensated by an acceleration magnitude. The threshold is a predetermined calibrated value correlating to vehicle acceleration. Preferably, the controller 14 includes in memory a lookup table that includes the threshold values indexed by the vehicle acceleration magnitude. Accordingly, the threshold is determined by selecting the threshold from the lookup table correlating to the vehicle acceleration magnitude. At step 122 the controller 14 records a second amount of time that the acceleration of the vehicle (a second recorded amount of time) is greater than a second threshold with the auxiliary brake 24 activated, compensated by the acceleration magnitude. The second threshold is determined in a manner similar to the threshold in step 120. At step 124 the controller 14 records a third amount of time that the acceleration of the vehicle (a third recorded amount of time) is less than a third threshold. At step 126 the controller 14 records a fourth amount of time that the acceleration of the vehicle (a fourth recorded amount of time) is less than a fourth threshold with the auxiliary brake 24 activated. The third and fourth thresholds are pre-determined to help calibrate the desire for extra braking. At step 128 the controller 14 records a fifth amount of time that the primary brake 22 has been activated.

At step 130 the controller 14 combines the road grade calculated at step 104 (FIG. 2), the position of the throttle 26 and vehicle speed monitored at step 102 (FIG. 2), the first recorded amount of time, the second recorded amount of time, the third recorded amount of time, the fourth recorded amount of time, and the fifth time to form a combined factor. These factors may be combined in any number of ways, including weighted sums, fuzzy logic, or normalization. In the preferred embodiment, these factors are normalized by the controller 14 to a number from 0 to 1 using calibration lookup tables stored in the memory of the controller 14. The normalized factors are then weighted and combined into the combined factor. The combined factor is determined using the following formula:

$$\text{Combined Factor} = K1^*\min(a, h) + K2^*\min(a, g) + K3^*\min(a, d, h) + \quad (5)$$
$$K4^*\min(e, h) + K5^*\min(b, e, h) + K6^*\min(f, h) + K7^*\min(c, f, h)$$

wherein K1, K2, K3, K4, K5, K6, and K7 are weight factors, min( ) is a minimization function, "a" is the percent grade, "b" is the first time, "c" is the second time, "d" is the fifth time, "e" is the third time, "f" is the fourth time, "g" is the position of the throttle 26, and "h" is the vehicle speed.

At step 132, the combined factor is then compared to an auxiliary brake threshold and a downshift threshold. At step 134 the controller 14 determines whether to activate the auxiliary brake 22, whether to activate the shift actuator 16 to change the gear ratio of the automatic transmission 12 (i.e. downshift), or whether to activate both the auxiliary brake 22 and the shift actuator 16. In the preferred embodiment, when the combined factor is greater than the auxiliary brake threshold, the controller 14 determines that it is desirable to activate the auxiliary brake 24. If the combined factor is greater than the downshift threshold, the controller 14 determines that it is desirable to activate the shift actuator 16 to downshift the automatic transmission 12. Alternatively, when the downshift threshold is calibrated to be greater than the auxiliary brake threshold and the combined factor is greater than the downshift threshold, the controller 14 determines that it is desirable to activate both the auxiliary brake 24 and the shift actuator 16 to downshift the automatic transmission 12. Once the controller 14 determines the desire for extra braking at step 112, the method 100 continues to step 114 (FIG. 2) and activates the extra braking.

Using the braking system 10 and braking method 100 of the present invention, extra braking can be activated automatically based on various factors and operating parameters of the vehicle. Moreover, the present invention allows various kinds and combinations of extra braking to be automatically employed to more efficiently brake the vehicle. Thus, the present braking system and method thereby allows the operator of the motor vehicle to focus on operating the vehicle rather than manually activating extra braking.

While the best modes for carrying out the invention have been described in detail, those familiar with the art to which this invention relates will recognize various alternative designs and embodiments for practicing the invention within the scope of the appended claims.

What is claimed is:

1. A system for braking a vehicle comprising:
    a transmission having a plurality of gear sets for establishing a plurality of forward and reverse gear ratios and an actuator for changing the gear ratios;
    a plurality of sensors for detecting a plurality of vehicle operating parameters;
    an auxiliary brake for reducing a speed of the vehicle; and
    a controller having a processor configured to receive a plurality of output signals from the plurality of sensors and wherein the controller has control logic for activating one of the actuator and the auxiliary brake based on the received output signals, wherein the plurality of operating parameters detected from the plurality of sensors includes an output signal indicative of an acceleration of the vehicle, and wherein the control logic includes a first control logic for recording an amount of time that the acceleration of the vehicle is less than a first threshold.

2. The system of claim 1, further comprising a primary brake for reducing the speed of the vehicle and wherein the control logic includes a second control logic for determining if the primary brake is activated.

3. The system of claim 2, further comprising a throttle for controlling an acceleration of the vehicle and wherein the control logic includes a third control logic for determining a position of the throttle.

4. The system of claim 3, wherein the control logic includes a fourth control logic for calculating a road grade from the operating parameters detected by the plurality of sensors.

5. The system of claim 4, wherein the plurality of operating parameters detected from the plurality of sensors includes an output signal indicative of a speed of the vehicle.

6. The system of claim 5, wherein the control logic includes a fifth control logic to activate one of the auxiliary brake or actuator based on the primary brake activation, the throttle activation, the road grade, the acceleration, and the speed.

7. The system of claim 6, wherein the control logic includes a sixth control logic for recording a second amount of time that the acceleration is less than a second threshold and the auxiliary brake is activated.

8. The system of claim 7, wherein the control logic includes a seventh control logic for recording a third amount of time that the acceleration value is greater than a third threshold compensated by an acceleration magnitude.

9. The system of claim 8, wherein the control logic includes an eighth control logic for recording a fourth amount of time that the acceleration value is greater than a fourth threshold and the auxiliary brake is activated compensated by an acceleration magnitude.

10. The system of claim 9, wherein the control logic includes a ninth control logic for determining a fifth amount of time that the primary brake has been activated.

11. The system of claim 10, wherein the control logic includes a tenth control logic for combining the road grade, the throttle position, the speed, the first time, the second time, the third time, the fourth time, and the fifth time into a combined value, and the combined value is used to determine whether to activate one of the auxiliary brake and the actuator.

12. The system of claim 11, wherein the combined value determines whether the auxiliary brake is activated, whether the actuator is activated, or whether both the auxiliary brake and the actuator are activated together.

13. A method for braking a vehicle having a throttle, a primary brake and an auxiliary brake, the method comprising the following steps:
   determining a road grade;
   determining an acceleration of the vehicle;
   determining an activation status of the primary brake;
   determining a position of the throttle;
   determining a first amount of time the vehicle acceleration is different from a first threshold, a second amount of time the vehicle acceleration is different from a second threshold with the auxiliary brake activated, and a third amount of time the primary brake is activated;
   determining whether extra braking is desirable based on whether the road grade exceeds a road grade threshold, whether the vehicle is accelerating, whether the primary brake is activated, and the position of the throttle; and
   activating the auxiliary brake based on the extra braking determination.

14. The method of claim 13, wherein determining whether extra braking is desirable includes combining the road grade, the speed of the vehicle, the position of the throttle, the first time, the second time, and the third time into a combined factor.

15. The method for braking of claim 14, wherein the combined factor is compared to an auxiliary brake threshold and the auxiliary brake is activated if the combined factor is greater than the auxiliary brake threshold.

16. The method for braking of claim 15, wherein the vehicle includes an automatic transmission with a plurality of drive ratios, and determining whether extra braking is desirable includes comparing the combined factor to a downshift threshold and the drive ratio is changed when the combined factor is greater than the downshift threshold.

* * * * *